(12) United States Patent
Kishi et al.

(10) Patent No.: US 10,914,342 B2
(45) Date of Patent: Feb. 9, 2021

(54) SLIDING MEMBER AND METHOD FOR MANUFACTURING THE SAME

(71) Applicants: DENSO CORPORATION, Kariya (JP); TOHOKU UNIVERSITY, Sendai (JP); TOCALO Co., Ltd., Kobe (JP)

(72) Inventors: Kentaro Kishi, Kariya (JP); Yasunori Niiyama, Kariya (JP); Koshi Adachi, Sendai (JP); Shinya Miki, Funabashi (JP)

(73) Assignees: DENSO CORPORATION, Kariya (JP); TOHOKU UNIVERSITY, Sendai (JP); TOCALO CO., LTD., Kobe (JP)

( * ) Notice: Subject to any disclaimer, the term of this patent is extended or adjusted under 35 U.S.C. 154(b) by 90 days.

(21) Appl. No.: 16/229,244

(22) Filed: Dec. 21, 2018

(65) Prior Publication Data

US 2019/0195281 A1 Jun. 27, 2019

(30) Foreign Application Priority Data

Dec. 25, 2017 (JP) ................. 2017-247991

(51) Int. Cl.
*F16C 33/12* (2006.01)
*F16C 33/10* (2006.01)
*F16C 33/04* (2006.01)
*C10N 50/00* (2006.01)

(52) U.S. Cl.
CPC ............ *F16C 33/12* (2013.01); *F16C 33/043* (2013.01); *F16C 33/10* (2013.01); *F16C 33/1095* (2013.01); *F16C 33/124* (2013.01); *C10M 2201/041* (2013.01); *C10N 2050/025* (2020.05); *C10N 2050/14* (2020.05); *F05C 2251/14* (2013.01); *F05C 2253/12* (2013.01); *F16C 2206/56* (2013.01); *F16C 2206/60* (2013.01)

(58) Field of Classification Search
CPC ...... F16C 33/12; F16C 33/10; F05C 2253/12; F05C 2251/14; C10M 2201/041; C10N 2050/023; C10N 2050/08
See application file for complete search history.

(56) References Cited

U.S. PATENT DOCUMENTS

2007/0141347 A1\* 6/2007 Nakagawa .......... C23C 14/0605
428/408
2012/0308949 A1\* 12/2012 Hirose .................... C23C 16/50
432/52

FOREIGN PATENT DOCUMENTS

JP 2009241252 A * 10/2009 ......... C23C 14/0605
JP 5730960 6/2015
JP 6095090 3/2017

\* cited by examiner

*Primary Examiner* — Vishal V Vasisth
(74) *Attorney, Agent, or Firm* — Nixon & Vanderhye P.C.

(57) ABSTRACT

A sliding member includes: a base material; a solid lubricant layer arranged on a surface of the base material; a defect layer having a material defect, disposed in the solid lubricant layer, and being changeable into an ultra low friction layer by mechanical stress more easily than changing from the solid lubricant layer to the ultra low friction layer; and a ultra low friction layer covering a surface of the defect layer.

13 Claims, 4 Drawing Sheets

SLIDING MEMBER AND METHOD FOR MANUFACTURING THE SAME

CROSS REFERENCE TO RELATED APPLICATION

This application is based on Japanese Patent Application No. 2017-247991 filed on Dec. 25, 2017, the disclosure of which is incorporated herein by reference.

TECHNICAL FIELD

The present disclosure relates to a sliding member, and a method for manufacturing the same.

BACKGROUND

Patent Literature 1 discloses a sliding member having an amorphous carbon film including hydrogen. Patent Literature 1 discloses a layer including a graphite on a surface. In the structure of Patent Literature 1, a plurality of amorphous carbon layers are alternately stacked. Patent Literature 2 discloses a sliding member coated with a hard carbon film. Furthermore, Patent Literature 2 proposes to use a sliding member in an environment where liquid exists after "adaptation" treatment in an environment where no liquid exists.

In Patent Literature 1, a plurality of amorphous carbon layers may be peeled off at the same time. Therefore, the low friction coefficient due to the layer including graphite may not be continued for a long time. In addition, in Patent Literature 2, "adaptation" processing prior to actual use is necessary. Further improvement is required on the sliding member and a manufacturing method of the sliding member in view of the above described difficulties and/or not mentioned other difficulties.

Patent Literature 1: JP-5730960-B
Patent Literature 2: JP-6095090-B

SUMMARY

It is an object of the present disclosure to provide a sliding member and a manufacturing method of the sliding member, in which a low friction coefficient at the beginning of use is maintained over a long period of time.

According to a first aspect of the present disclosure, a sliding member includes: a base material; a solid lubricant layer arranged on a surface of the base material; a defect layer having a material defect, disposed in the solid lubricant layer, and being changeable into an ultra low friction layer by mechanical stress more easily than changing from the solid lubricant layer to the ultra low friction layer; and a ultra low friction layer covering a surface of the defect layer.

In the above sliding member, the defect layer, in which a material defect is introduced in the solid lubricant layer, is provided. The defect layer is more likely to change into the ultra low friction layer due to mechanical stress rather than changing from the solid lubricant layer to the ultra low friction layer. For this reason, a low friction coefficient at a beginning of use is sustained over a long period of time.

According to a second aspect of the present disclosure, a method for manufacturing a sliding member includes: preparing a base material; forming a solid lubricant layer on a surface of the base material; introducing a material defect into the solid lubricant layer, and forming a defect layer which is changeable into an ultra low friction layer by mechanical stress more easily than changing from the solid lubricant layer to the ultra low friction layer; and placing the defect layer in a sliding environment after the defect layer is formed, and changing the defect layer to the ultra low friction layer by mechanical stress. In the above method for manufacturing the sliding member, the defect layer is formed by introducing a material defect into the solid lubricant layer. The defect layer is more likely to change into the ultra low friction layer due to mechanical stress rather than changing from the solid lubricant layer to the ultra low friction layer. Therefore, the defect layer changes to the ultra-low friction layer due to mechanical stress caused by a sliding action. For this reason, a low friction coefficient at a beginning of use is sustained over a long period of time.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
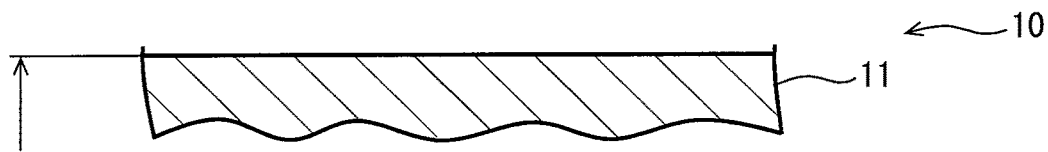
FIG. 1 is a cross-sectional view showing a base material according to a first embodiment.

Hereinafter, a plurality of embodiments will be described with reference to the drawings. In some embodiments, parts that are functionally and/or structurally corresponding to each other and/or associated with each other are given the same reference numerals, or reference numerals with different hundred digit or more digits. For corresponding parts and/or associated parts, additional explanations can be made to the description of other embodiments.

First Embodiment

In FIG. 1, a sliding member 10 has a base material 11. The base material 11 is provided by metal or nonmetal. The base material 11 can be provided by iron, aluminum, nickel, and alloys thereof. The base material 11 may be provided by ceramics in which inorganic compounds are sintered. The base material 11 is provided to have a ball shape or a circular plate as a test piece. A testing machine to which a test piece is tested can refer to Patent Literature 2. The description of Patent Literature 2 may be incorporated by reference as a part of this disclosure. In this disclosure, the term of "sliding" should be interpreted in a broad sense. The term of "sliding" includes both relative sliding movement of two members with friction and rolling motion which is the relative movement of the contact point of the two members.

Figure 2:
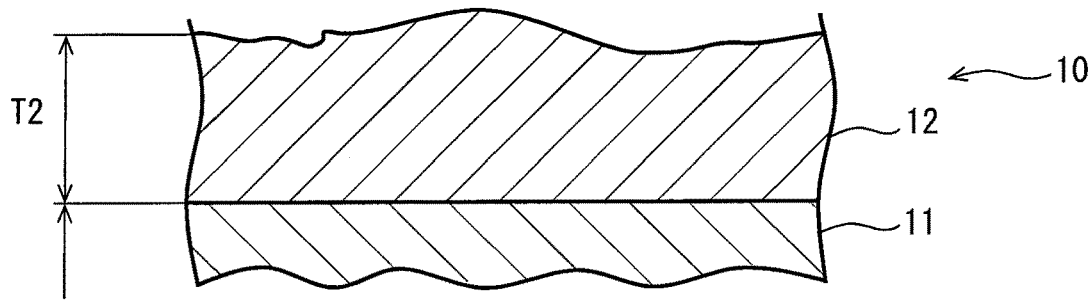
FIG. 2 is a cross-sectional view showing a base material and a solid lubricant layer.

In FIG. 2, the sliding member 10 has a solid lubricant layer 12. The solid lubricant layer 12 is disposed on the surface of the base material 11. The solid lubricant layer 12 covers the surface of the base material 11. The solid lubricant layer 12 is a diamond-like carbon layer (Diamond-Like Carbon layer: DLC layer). The solid lubricant layer 12 is also defined as a hard carbon film in which carbon atoms are bonded.

The hard carbon film includes a monocrystalline diamond film and an amorphous hard film having a hydrocarbon or an allotrope of carbon. Furthermore, the hard carbon film is a hard film including a graphite layer formed on the surface of the above-mentioned hard carbon film. The solid lubricant layer 12 may be provided by chromium nitride (CrN). The solid lubricant layer 12 may be provided by silicon nitride ($Si_3N_4$). The solid lubricant layer 12 may be provided by silicon carbide (SiC).

Figure 3:
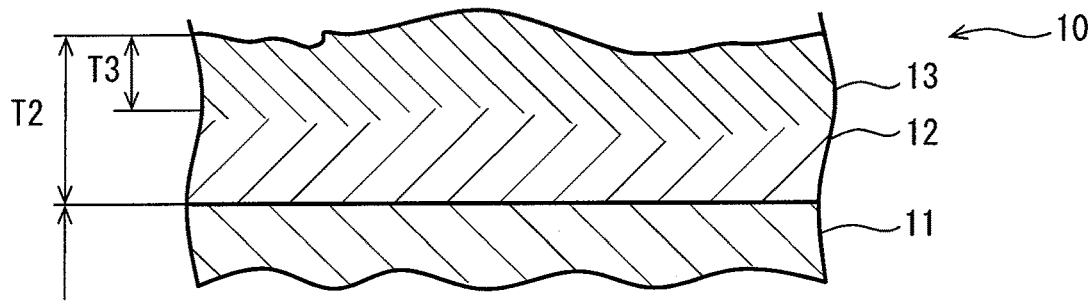
FIG. 3 is a cross-sectional view showing a defect layer formed in a solid lubricant layer.

In FIG. 3, the sliding member 10 has a defect layer 13 formed by changing the solid lubricant layer 12. The defect layer 13 is formed by a carbon bonding defect. In the defect layer 13, the structure of the atomic bond in the material is more likely to change than the solid lubricant layer 12. The defect layer 13 is in a state easily changing from a structure as a DLC layer to a structure as a graphite layer. The defect layer 13 changes into a graphite layer due to mechanical stress. When receiving mechanical stress, changeability that the defect layer 13 changes into a graphite layer is higher than the changeability that the solid lubricant layer 12 changes into a graphite layer. In other words, the carbon bonding structure of the defect layer 13 is more likely to change to a graphite layer than the solid lubricant layer 12.

The hardness of the surface of the defect layer 13 is lower than the hardness of the surface of the solid lubricant layer 12. Since the defect layer 13 is introduced, the hardness of the surface of the sliding member 10 is lowered. The hardness of the surface of the solid lubricant layer 12 before the introduction of the defect layer 13 and the hardness of the surface of the defect layer 13 are measured by a nano indenter process utilizing nano indication or a micro Vickers test for measuring Vickers hardness.

Introducing of the defect layer 13 to the inside of the solid lubricant layer 12 is also defined as introduction of an active point into the solid lubricant layer 12. The defect layer 13 is introduced over the surface of the solid lubricant layer 12 and in a predetermined depth range by utilizing the physical action at the atomic level. The defect layer 13 is introduced using an element. The defect layer 13 is formed by a manufacturing method and a manufacturing apparatus which applies high energy to atoms and affects on the solid lubricant layer 12. The surface of the solid lubricant layer 12 and the surface of the defect layer 13 include a functional group having a high affinity for the atmosphere in the environment where the sliding member 10 is used. For example, when the sliding member 10 is used in an environment where water is disposed, a functional group having high affinity and high reactivity with water is attached thereto. The functional group used here is, for example, a hydroxyl group.

The presence of the defect layer 13 can be specified by an intra-film defect of the solid lubricant layer 12. The intra-film defects can be measured by Raman spectroscopy. The defect layer 13 shows 0.056 or more in the ID/IG ratio and 0.048 or more in the SD/SG ratio by Raman spectroscopy having correlation with intra-film defects.

The solid lubricant layer 12 has a thickness T 2. The defect layer 13 has a thickness T 3. The thickness T 3 is smaller than the thickness T 2. The defect layer 13 does not reach the base material 11. Between the defect layer 13 and the base material 11, the solid lubricant layer 12 having fewer defects than the defect layer 13 is left. Even in the state where the defect layer 13 is formed, the solid lubricant layer 12 spreads so as to cover the entire range of the sliding range.

The solid lubricant layer 12 provided by the aforementioned hard carbon film, chromium nitride, silicon nitride, or silicon carbide can have a defect layer 13 which is a defect part of the material. A defect part includes (i) a portion in which the bond of the element is missing or unbound due to mismatching of the cluster etc. and/or (ii) a portion in which radicals, and/or clusters are relatively small, and/or (iii) a portion which is formed by disorder of atomic arrangement and disturbance of crystal structure. That is, the defect part represents at least one of the above items (i), (ii), and (iii). The defect part may represent two or more of the above items (i), (ii), and (iii).

Figure 4:
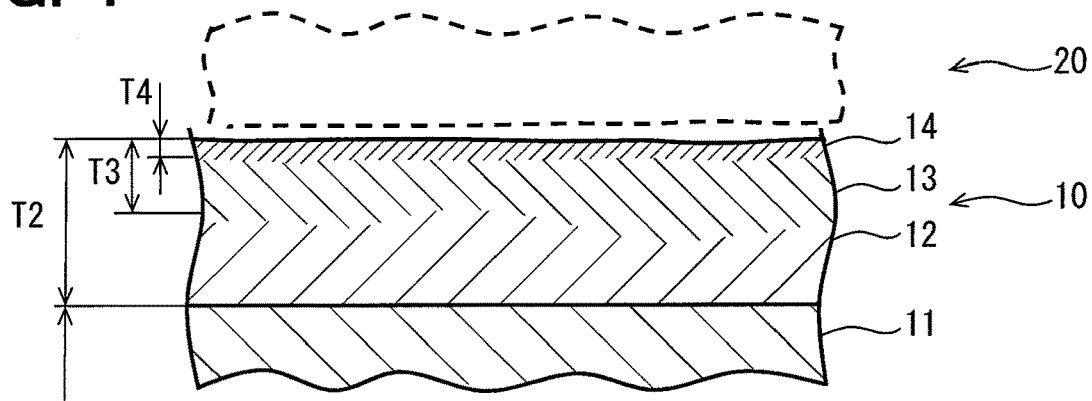
FIG. 4 is a cross-sectional view showing an ultra-low friction layer formed in a defect layer.

FIG. 4 shows the utilization state of the sliding member 10. FIG. 4 shows the ultra-low friction layer 14 formed in the defect layer 13. In the use state, the sliding member 10 is slid with the other sliding member 20. Sliding (includes sliding and rolling) applies mechanical stress to the surface of the defect layer 13. This mechanical stress changes the defect layer 13 into the ultra-low friction layer 14. The ultra-low friction layer 14 covers the surface of the defect layer 13.

In the operation of the sliding of the sliding member 10, the defect layer 13 creates an ultra-low friction layer 14 on its surface, i.e., on the sliding surface. In other words, in the method of manufacturing the sliding member, the ultra-low friction layer 14 is formed on the surface of the defect layer 13 by placing the sliding member 10 in a sliding environment. The sliding environment may be an operating environment in which the sliding member 10 is actually used. The defect layer 13 is more likely to change into the ultra low friction layer 14 due to mechanical stress rather than changing from the solid lubricant layer 12 to the ultra low friction layer 14 described later. The ultra low friction layer 14 is a graphite layer.

The ultra low friction layer 14 has a thickness T4. The thickness T4 is smaller than the thickness T3. The ultra-low friction layer 14 does not reach the solid lubricant layer 12. Between the solid lubricant layer 12 and the ultra low friction layer 14, the defect layer 13 is left. Therefore, the sliding member 10 has the solid lubricant layer 12, the defect layer 13, and the ultra low friction layer 14 on the base material 11.

The ultra-low friction layer 14 is a layer exhibiting super lubricity. When the solid lubricant layer 12 is provided by a hard carbon film, the ultra low friction layer 14 can also be defined as a DLC layer with a SP 2 bonding rich state. SP 2 bond refers to the bonding state of atoms by a SP 2 orbit. Rich means that the DLC layer shows properties as a graphite layer. In the sliding member 10, at least one of the two members which slide relative to each other is provided with a defect layer 13 in a material, that is, a sliding member in which a layer easily changing from the solid lubricant layer 12 to the ultra low friction layer 14 is introduced.

Figure 5:
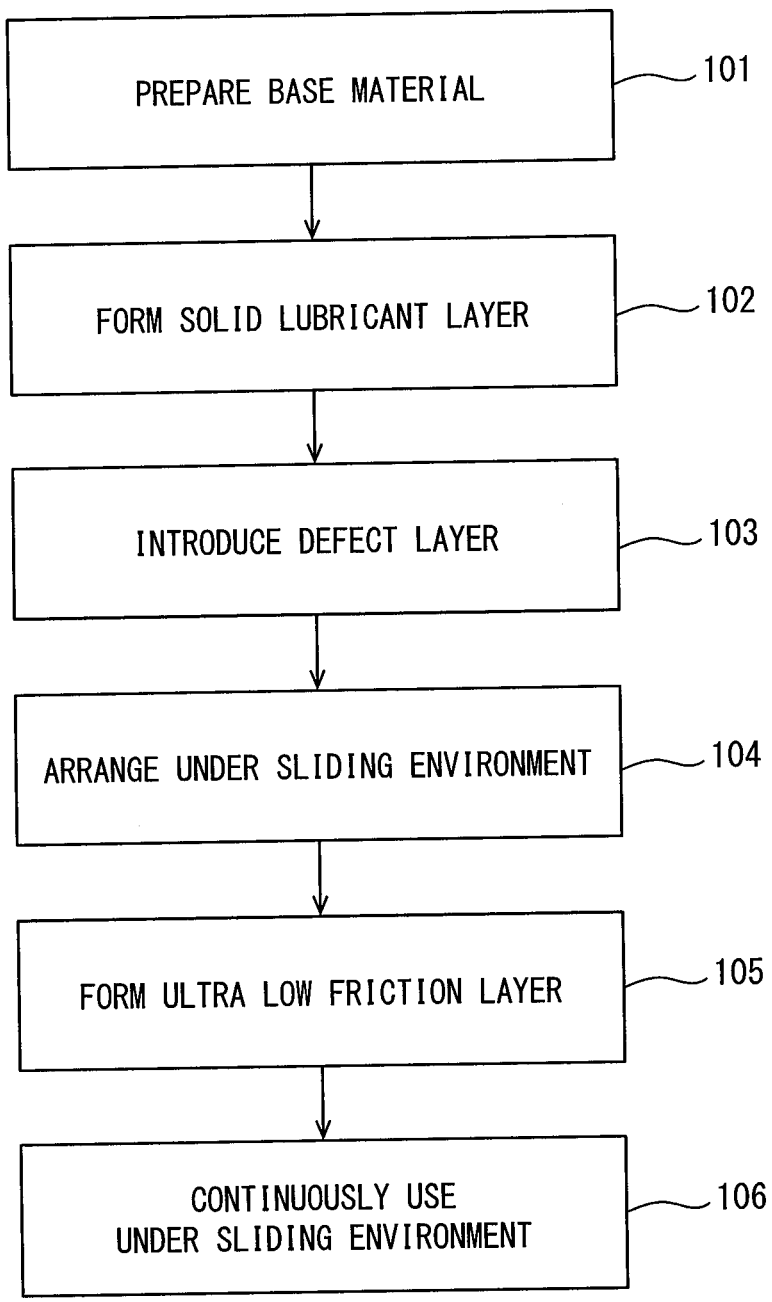
FIG. 5 is a flowchart showing a method for manufacturing a sliding member.

FIG. 5 shows a method of manufacturing the sliding member 10. In step 101, a base material 11 is prepared. In step 102, the solid lubricant layer 12 is formed on the base material 11. When the solid lubricant layer 12 is a DLC layer, various manufacturing methods including a PVD (Physical Vapor Deposition) method and a CVD (Chemical Vapor Deposition) method can be used.

In step 103, the defect layer 13 is formed by introducing defects of the material into the solid lubricant layer 12. At the same time, a functional group is imparted to the surface of the solid lubricant layer 12, that is, the surface of the defect layer 13. The defect layer 13 is more likely to change into the ultra low friction layer 14 due to mechanical stress rather than changing from the solid lubricant layer 12 to the ultra low friction layer 14. Mechanical stress is a stress applied to the defect layer 13 or the solid lubricant layer 12. This mechanical stress is a stress generated by placing the sliding member 10 in its use environment, that is, in a sliding environment.

The step of introducing the defect layer 13 in step 103 is performed by a manufacturing apparatus to be described later. The step of forming the defect layer 13 may include introducing defects into the surface and the inside of the solid lubricant layer 12 by electromagnetic treatment. The step of forming the defect layer 13 may include the step of introducing defects by the physical action of the highly-energized atoms. The step of forming the defect layer 13 may include introducing defects into the surface and inside of the solid lubricant layer 12 while leaving the solid lubricant layer 12 which is a hard carbon film.

In step 104, the sliding member 10 having the solid lubricant layer 12 and the defect layer 13 is placed under a sliding environment. The sliding environment may be an operating environment in which the sliding member 10 is actually used. In step 105, the ultra low friction layer 14 is formed on the surface of the defect layer 13 by applying mechanical stress according to a sliding operation to the defect layer 13 of the sliding member 10. Changing of the defect layer 13 to the ultra low friction layer 14 includes changing the defect layer 13, from the surface, to the ultra low friction layer 14 while leaving the defect layer 13 as the lower layer. The step of step 105 may be provided by the beginning of the actual use period of the sliding member 10. The stage of step 105 may be provided by a pre-conditioning interim operation period, which is distinct from actual use. In step 106, the sliding member 10 is continuously used under the sliding environment.

The process from step 104 to step 106 is also a stage of placing the defect layer 13 under the sliding environment after forming the defect layer 13 to change the defect layer 13 to the ultra low friction layer 14 by mechanical stress. During the process from step 104 to step 106, the defect layer 13 forms a sliding surface while wearing. The defect layer 13 provides a higher hardness than the ultra-low friction layer 14, and exhibits higher durability than the ultra-low friction layer 14 even in a sliding environment. The defect layer 13 provides higher elasticity than the solid lubricant layer 12, and exhibits high shape conformability under a sliding environment. As a result, the defect layer 13 gradually wears without causing large peeling-off. In other words, the defect layer 13 provides mechanical "adaptation". Furthermore, an ultra-low friction layer 14 is formed on the surface after the "adaptation". Therefore, the defect layer 13 reduces the local surface pressure by the "adaptation" and further promotes the "adaptation."

By continuously using, the ultra-low friction layer 14 or a part of the defect layer 13 wears. However, a part of the defect layer 13 is newly changed to the ultra low friction layer 14 by the sliding operation. The defect layer 13 is formed at a predetermined depth from the surface by introducing defects into the solid lubricant layer 12. Therefore, the ultra-low friction layer 14 is maintained. Furthermore, since all of the solid lubricant layer 12, the defect layer 13, and the ultra-low friction layer 14 are disposed on the surface of the base material 11, it is suppressed that these layers are simultaneously excavated. As a result, the ultra low friction state by the ultra low friction layer 14 is continuously maintained.

Figure 6:
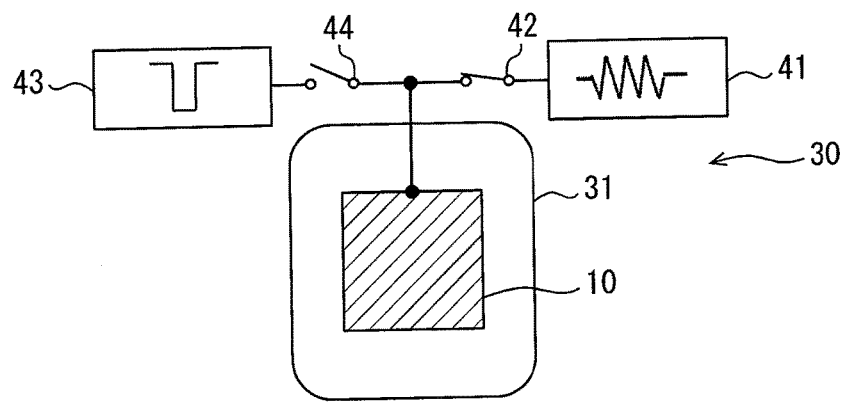
FIG. 6 is a cross-sectional view showing a manufacturing apparatus.
Figure 7:
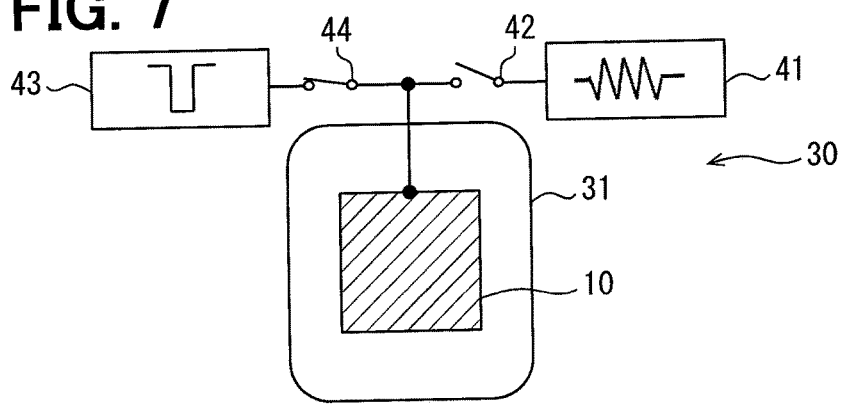
FIG. 7 is a cross-sectional view showing the manufacturing apparatus.

FIGS. 6 and 7 show the manufacturing apparatus 30 used in the manufacturing stage in step 103. The manufacturing apparatus 30 may include a chamber 31 that accommodates the sliding member 10 and a gas supplier that supplies a reaction gas into the chamber 31. The chamber 31 accommodates the sliding member 10 having the base material 11 on which the solid lubricant layer 12 is formed. The manufacturing apparatus 30 includes a high-frequency power supply 41 and a switch 42. The manufacturing apparatus 30 includes a high-voltage power supply 43 and a switch 44. The switch 42 and the switch 44 are alternately opened and closed. The manufacturing apparatus 30 utilizes electromagnetic action to impart high energy to the element in some cases and introduces the defect layer 13. The manufacturing apparatus 30 can be an electrical processing apparatus. Depending on circumstances, the manufacturing apparatus 30 cuts bonds of atoms in the solid lubricant layer 12 from the surface layer thereof by utilizing the elements of the reaction gas, and introduces an active point, thereby forming the defect layer 13.

As shown in FIG. 6, during a period in which only the switch 42 is closed, the high-frequency power supply 41 applies high energy to the reaction gas in some cases and converts the gas into plasma.

As shown in FIG. 7, the high-voltage pulse power supply 43 changes the crystal structure of the solid lubricant layer 12 by the plasmatized element in some cases.

According to the embodiment described above, it is possible to provide the sliding member 10 in which a low friction coefficient at the beginning of use is sustained over a long period of time.

Second Embodiment

The present embodiment is a modification in which the preceding embodiment is a base fundamental form. In the above embodiment, the defect layer 13 is electromagnetically introduced using a high voltage. Alternatively, the defect layer 13 may be introduced by light energy.

Figure 8:
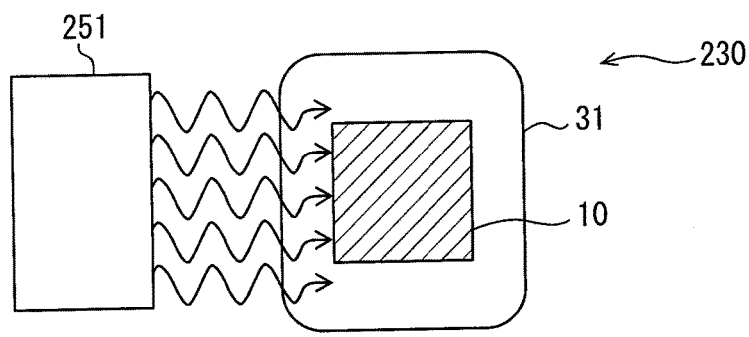
FIG. 8 is a cross-sectional view showing a manufacturing apparatus according to a second embodiment.

As illustrated in FIG. 8, the manufacturing apparatus 230 has a radiation source 251. The radiation source 251 irradiates the solid lubricant layer 12 formed on the base material 11 with a high-energy electromagnetic wave which is not visible light. As electromagnetic waves, alpha rays, gamma rays, X rays, and the like can be used. In this embodiment, the defect layer 13 is introduced by electromagnetic waves.

Third Embodiment

The present embodiment is a modification in which the preceding embodiment is a base fundamental form. In the above embodiment, the defect layer 13 is electromagnetically introduced using a high voltage. Alternatively, the defect layer 13 may be introduced by thermal energy.

Figure 9:
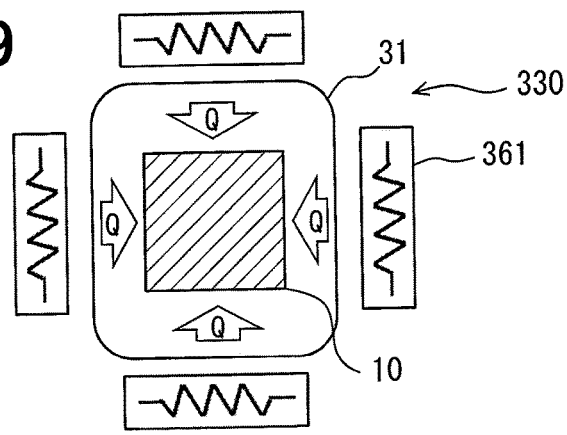
FIG. 9 is a cross-sectional view showing a manufacturing apparatus according to a third embodiment.

As shown in FIG. 9, the manufacturing apparatus 330 has a plurality of electric heaters 361. For example, the electric heater 361 applies thermal energy Q to the solid lubricant layer 12 formed on the base material 11, and introduces the defect layer 13. It is desirable that the heating is performed in a vacuum atmosphere while suppressing the reaction with oxygen in the atmosphere.

Fourth Embodiment

The present embodiment is a modification in which the preceding embodiment is a base fundamental form. In the above embodiment, the structure of the sliding member 20 sliding with the sliding member 10 is not specified. Alternatively, the member sliding on the sliding member 10 can be provided by various members.

Figure 10:
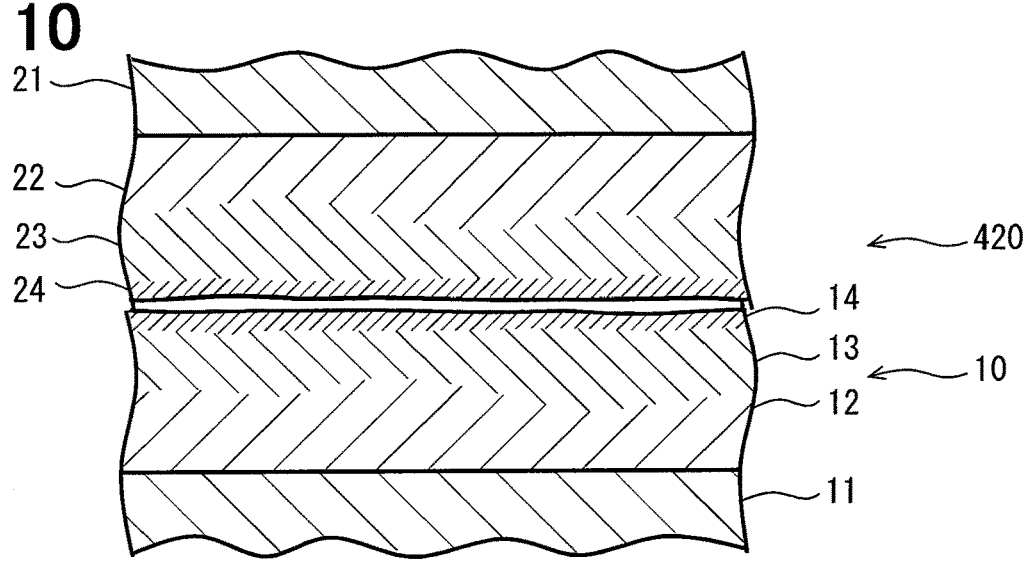
FIG. 10 is a cross-sectional view showing a sliding member according to a fourth embodiment.

In FIG. 10, the sliding member 10 slides with the sliding member 420. The sliding member 420 has a structure similar to that of the sliding member 10. That is, the sliding member 420 has a base material 21, a solid lubricant layer 22, a defect layer 23, and an ultra-low friction layer 24. According to this embodiment, since the ultra-low friction layer 14 and the ultra-low friction layer 24 slide with each other, the initial low coefficient of friction maintains for a long time.

Fifth Embodiment

The present embodiment is a modification in which the preceding embodiment is a base fundamental form.

Figure 11:
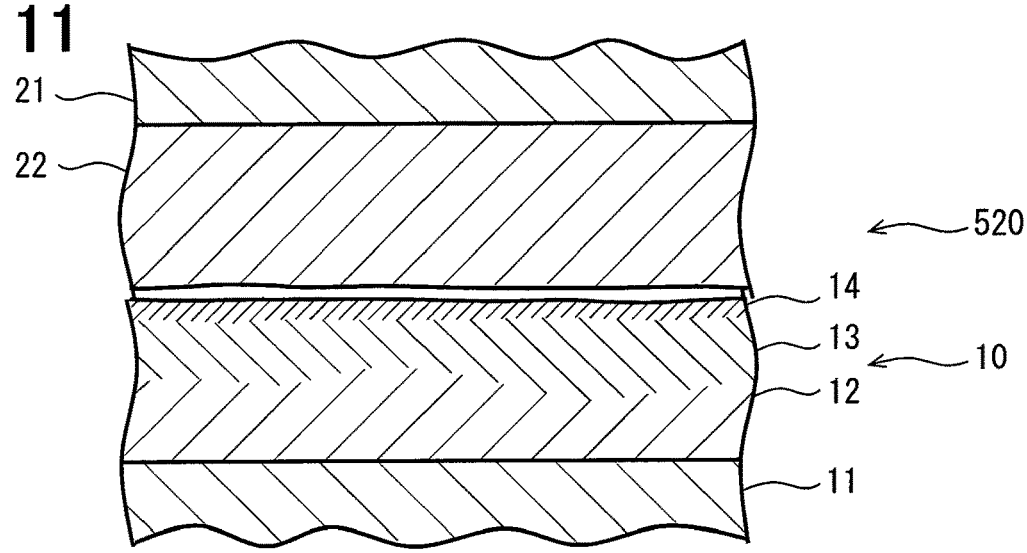
FIG. 11 is a cross-sectional view showing a sliding member according to a fifth embodiment.

In FIG. 11, the sliding member 10 slides with the sliding member 520. The sliding member 520 has a base material 21 and a solid lubricant layer 22. Even in this embodiment, the initial low friction coefficient lasts for a long time.

Sixth Embodiment

The present embodiment is a modification in which the preceding embodiment is a base fundamental form.

Figure 12:
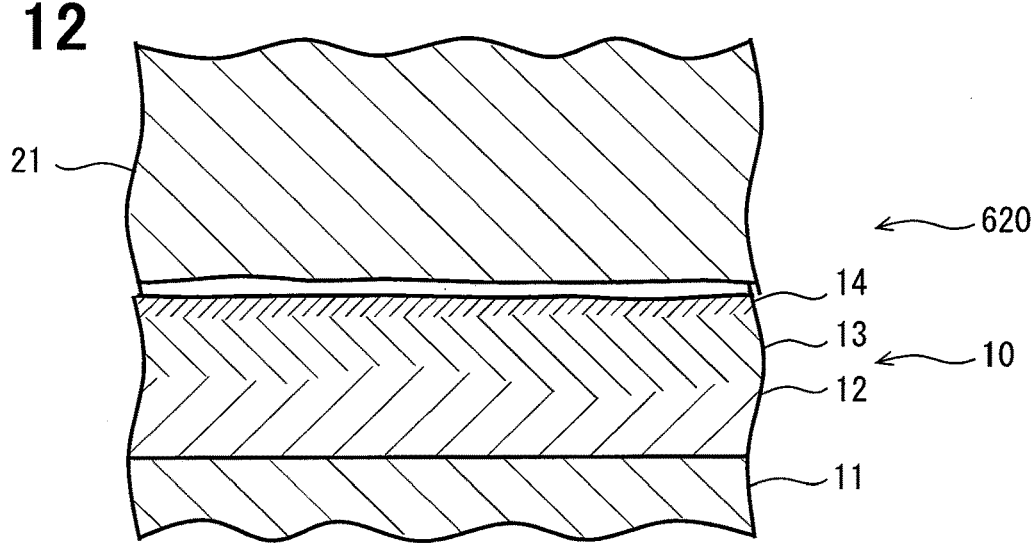
FIG. 12 is a cross-sectional view showing a sliding member according to a sixth embodiment.

In FIG. 12, the sliding member 10 slides with the sliding member 620. The sliding member 520 has only the base material 21. Even in this embodiment, the initial low friction coefficient lasts for a long time.

Other Embodiments

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. Disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment.

It is noted that a flowchart or the processing of the flowchart in the present application includes sections (also referred to as steps), each of which is represented, for instance, as 101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A sliding member comprising:
   a base material;
   a solid lubricant layer arranged on a surface of the base material;
   a defect layer having a material defect, disposed in the solid lubricant layer, and being changeable into an ultra low friction layer by mechanical stress more easily than changing from the solid lubricant layer to the ultra low friction layer; and
   a ultra low friction layer covering a surface of the defect layer, wherein
   the ultra low friction layer has a friction coefficient equal to or lower than a predetermined friction coefficient having a value of 0.05 such that the ultra low friction layer has super lubricity, and
   the solid lubricant layer is made of chromium nitride, silicon nitride, or silicon carbide.

2. The sliding member according to claim 1, wherein:
   the solid lubricant layer is defined as a hard carbon film in which carbon atoms are bonded; and
   the defect layer is provided by a carbon bonding defect.

3. The sliding member according to claim 2, wherein:
   the solid lubricant layer is made of diamond-like carbon.

4. The sliding member according to claim 3, wherein:
   the defect layer has an ID/IG ratio equal to or more than 0.056 and a SD/SG ratio equal to or more than 0.048 in Raman spectroscopy,
   the ID/IF ratio is defined by a ratio between an integrated intensity ID of a D band and an integrated intensity IG of a G band in a Raman spectrum, and
   the SD/SG ratio is defined by a ratio between an area of a D band and an area of a S band in a Raman spectrum.

5. The sliding member according to claim 1, wherein:
   the sliding member has a functional group disposed on a surface of the defect layer.

6. A method for manufacturing a sliding member comprising:
   preparing a base material;
   forming a solid lubricant layer on a surface of the base material;
   introducing a material defect into the solid lubricant layer, and forming a defect layer which is changeable into an ultra low friction layer by mechanical stress more easily than changing from the solid lubricant layer to the ultra low friction layer; and
   placing the defect layer in a sliding environment after the defect layer is formed, and changing the defect layer to the ultra low friction layer by mechanical stress, wherein
   the ultra low friction layer has a friction coefficient equal to or lower than a predetermined friction coefficient having a value of 0.05 such that the ultra low friction layer has super lubricity, and
   the solid lubricant layer is made of chromium nitride, silicon nitride, or silicon carbide.

7. The method for manufacturing the sliding member according to claim 6, wherein:
   the forming of the defect layer includes introducing a defect into a surface and an inside of the solid lubricant layer by an electromagnetic action.

8. The method for manufacturing the sliding member according to claim 6, wherein:

the forming of the defect layer includes introducing a defect into the solid lubricant layer by a physical action of an highly energized atom.

9. The method for manufacturing the sliding member according to claim 6, wherein:
   the solid lubricant layer is a hard carbon film;
   the forming of the defect layer includes introducing a defect into a surface and an inside of the hard carbon film while leaving the hard carbon film; and
   the changing to the ultra-low friction layer includes changing the defect layer, from the surface of the defect layer, to the ultra low friction layer with leaving a part of the defect layer.

10. The sliding member according to claim 1, wherein the ultra low friction layer is a graphite layer.

11. The method for manufacturing the sliding member according to claim 6, wherein the ultra low friction layer is a graphite layer.

12. The sliding member according to claim 1, wherein the solid lubricant layer is made of chromium nitride or silicon carbide.

13. The method for manufacturing the sliding member according to claim 6, wherein the solid lubricant layer is made of chromium nitride or silicon carbide.

* * * * *